F. MARTIN.

DEEP-WELL PACKING.

No. 7,244. Reissued July 25, 1876.

Witnesses.
Henry Orth
G. E. Thumpshny

Inventor
Francis Martin
per H. A. Doubleday
atty.

N. PETERS, PHOTO-LITHOGRAPHER, WASHINGTON, D. C.

UNITED STATES PATENT OFFICE.

FRANCIS MARTIN, OF NEW YORK, N. Y., ASSIGNOR TO HENRY H. DOUBLEDAY.

IMPROVEMENT IN DEEP-WELL PACKING.

Specification forming part of Letters Patent No. 49,903, dated September 12, 1865; reissue No. 7,244, dated July 25, 1876; application filed May 13, 1876.

*To all whom it may concern:*

Be it known that I, FRANCIS MARTIN, of the city, county, and State of New York, have invented a new and useful Improvement in Packing for Tubes of Oil and other Wells; and I do hereby declare that the following is a full, clear, and exact description thereof, which will enable others skilled in the art to fully understand and use the same, reference being had to the accompanying drawings, forming part of this specification, in which—

Figure 2:
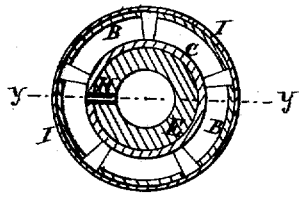
Figure 1:
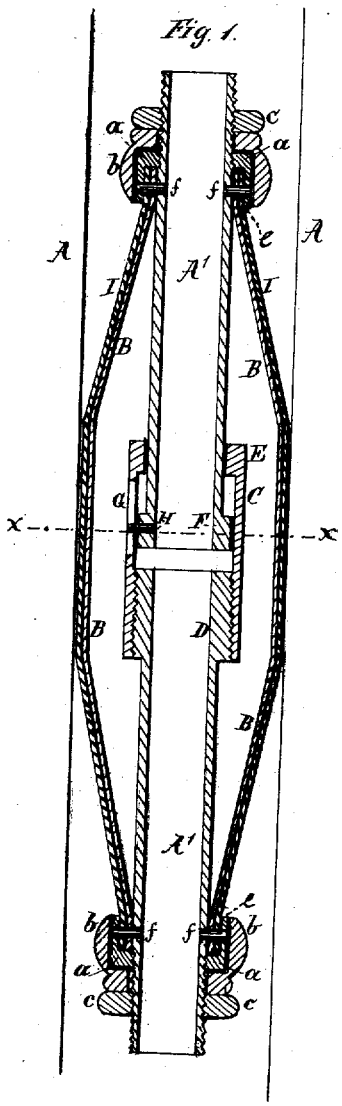

Figure 1 is an axial section of an apparatus made according to my invention, with a section of those portions of the well-tube to which it is applied, *y y*, Fig. 2, being the line of section. Fig. 2 is a transverse section on the line *x x* of Fig. 1.

Similar letters of reference indicate like parts.

This invention relates to packing the space which intervenes between the tubing and the walls in oil-wells and other deep wells; and consists, first, in combining with a well-tube a flexible or yielding packing, the upper part of which is connected with said tube, the lower part of the packing being firmly supported against downward thrust, whereby the weight of the tubing presses upon the packing, and serves to expand or distend it (the packing) laterally, and press it against the sides of the well.

Another part of the invention relates to the combination with an eduction-tube of an oil-well, which is made in two sections, of a sliding or telescopic joint, a flexible packing surrounding the sliding joint, and an opening from the tube into the packing, whereby the weight of the column of liquid within the tube may act to distend the packer as the upper section of pipe or tube approaches the lower section, and the weight of the lower section of the tube may serve to reduce the diameter of the packing as the tubing is withdrawn from the well.

The invention further consists in certain details of construction, which will be fully explained.

A′ A′ designate parts of adjacent sections of a well-tube in place within a well, whose sides are indicated by the lines A. Their ends are coupled by a coupling-tube, C, one end of which is fixed by a screw-joint, D, or by any other suitable device about the end of one of the sections A′. In this example it is connected about the lower section. The upper end of the coupling-tube is enlarged on the inside, so as to form an inner circumferential rim or shoulder, E, which slides easily along the outside of the upper section A′, but is prevented from coming off the same by a rim, F, surrounding the lower end of said upper section.

A slot, G, is cut in the coupling-tube C, parallel with its axis, in which slot a pin, H, projecting from the rim F, is fitted, for the purpose of guiding the upper section of the well-tube when it slides along inside the coupling-tube, and so preventing it from having any rotary motion. If any rotary motion of the said section were to take place, its effect would be to twist and injure the elastic leaves B, which inclose the sliding joint.

The letter B designates metallic leaves or spring-plates, arranged about the well-tube, so as to inclose the joint of the well-tube and the coupling-pipe aforesaid. Their ends are secured to the said sections A′ A′ of the well-tube by means of nuts or screw-threaded rings *a a*, which have flanges *e e*, projecting in the direction of the sliding joint. The said nuts *a a* are screwed upon the sections A′ of the well-tube, respectively, and their positions thereon are to be such as that their flanges *e e* will inclose the ends of the elastic leaves B.

The several leaves, moreover, may be soldered together at their ends along adjacent edges, so as to form at those parts a complete or unbroken body; or the said leaves may be formed by cutting a series of longitudinal slits in the metal, said slits reaching nearly from one end to the other of such metallic portion, thereby forming a series of leaves, B. These leaves, whether made from separate strips of metal, or by making slits in a single sheet of metal, may be bent outward, as shown in Fig. 1, so that the central parts thereof shall always be clear of the coupling.

The nuts *a a* and leaves are secured to the several sections A′ of the well-tube and to each other by pins or screws *f*, and the nuts are inclosed by glands *b b*, which are held in place by jam-nuts C.

I is a covering of elastic material—such, for instance, as gutta-percha, or other suitable material which will not be corroded by the action of petroleum, or other substances with which it is liable to come in contact—placed about the leaves B, so as entirely to cover them, the ends of said covering being confined beneath the flange *c* of the nuts *a a*.

The operation of the apparatus is as follows: The sections A′ of the well-tube, to which the packing device is attached, are located at that part of the tube where the packing is to be used for shutting off surface-water and other water from the bottom of the well. When the well-tube is in place, its lowest section resting on the bottom of the well, that part of the tube which is above the sections A′ will, by its weight, force the upper one of said sections toward the lower one, thereby causing the central parts of said leaves B to bulge outward toward the sides of the well, and against the same, so as to make a tight joint with said sides, and thus prevent the passage of water downward from above the packing, or of gas or liquid from below upward.

If the weight of the superincumbent tubing is not sufficient to expand the metallic springs B sufficiently to pack the tube, a lever or weight may be applied thereto at the surface of the earth, so as to bring the sections A′ nearer together, and thus enlarge the diameter of the packing device.

When the well-tube is to be drawn out of the well, it is evident that the packing device will not obstruct its ascent, because so soon as the pressure of the superincumbent tubing is taken off the upper section A′, the elasticity of the spring-leaves will cause them to resume their normal position, and thus become reduced in diameter, when they can be drawn upward without touching the sides of the well.

The great advantage of this packing is, that it is sure to make a perfect water-tight joint.

When the tube is put in the well its weight pulls upon the lower section A′, and expands the slip-joint, and thus contracts the diameter of the series of springs B, and brings them close to the body of the tube, and thereby secures the packing, and especially the outer covering I, which is to be air and water tight, from injury.

When the tube rests on the bottom of the well the weight of that part which is above the packing contracts the slip-joint and expands the packing.

The outside of the covering I, at the middle of its length, may be covered with sheep-skin, with the wool outside, for the purpose of filling the pores of the rock, and any crevices which may exist at the point where the packing is applied.

By an examination of the drawings it will be seen that when the packer is pressed against the wall of the well, as in Fig. 1, oil can flow from the eduction-tube, through the slot G, into the packing-bag I, and thus, by a pressure within the packing-bag, counterbalance, or partially counterbalance, the pressure produced upon the outside of said bag by the column of water in the well.

It is also apparent that, so far as relates to expanding the packer laterally and pressing it against the walls of the well, the device would operate without the pins or screws *f*, as the packing would be compressed between the nuts or collars *a*; but the employment of these pins assists in reducing the diameter of the packing when the tubing is being removed from the well, as they insure that the weight of the lower part of the tubing shall hang upon the packing until the rims or shoulders E F come in contact, the arrangement of parts being such that such contact shall prevent any undue strain upon the packing when the tubing is being taken out.

What I claim is—

1. In combination with the eduction-tube of an Artesian well, a yielding or elastic packing, supported from below against downward pressure, and forced against the wall of the well by the weight of the superincumbent tubing, substantially as set forth.

2. In combination with the eduction-tube of an Artesian well, an elastic or flexible packing, supported from below against downward pressure, and a screw-threaded ring attached to the eduction-tube, and engaging with the upper part of the packing, substantially as set forth.

3. In combination with the eduction-tube of an Artesian well, an elastic or yielding packing, and a sleeve or cylinder of greater diameter than the eduction-tube, arranged within the packing and surrounding the eduction-tube, substantially as set forth.

4. In combination with the eduction-tube of an Artesian well, an elastic or flexible packing, a rim or shoulder upon the eduction-tube, and a corresponding rim upon the packer-support, whereby, when the eduction-tube is removed from the well, the rim or shoulders shall engage with each other, and withdraw the packer-support, substantially as set forth.

5. In an Artesian well, the combination of the sections A′ A′ of the eduction-tube, a sliding joint connecting these sections, a flexible packing surrounding the sliding joint, and an opening in the eduction-tube, whereby the liquid may flow from the tube into the packer, substantially as set forth.

FRANCIS MARTIN.

In presence of—
B. T. BURNHAM,
H. H. DOUBLEDAY.